US011992781B2

(12) United States Patent
Wood et al.

(10) Patent No.: US 11,992,781 B2
(45) Date of Patent: May 28, 2024

(54) TREADED TRACTION DEVICE AND SYSTEM FOR MODEL VEHICLES

(71) Applicant: TRAXXAS, L.P., McKinney, TX (US)

(72) Inventors: Jonathan Scott Wood, Frisco, TX (US); Otto Karl Allmendinger, Rowlett, TX (US)

(73) Assignee: TRAXXAS, L.P., McKinney, TX (US)

(*) Notice: Subject to any disclaimer, the term of this patent is extended or adjusted under 35 U.S.C. 154(b) by 420 days.

(21) Appl. No.: 17/217,012

(22) Filed: Mar. 30, 2021

(65) Prior Publication Data
US 2021/0299584 A1 Sep. 30, 2021

Related U.S. Application Data

(60) Provisional application No. 63/002,065, filed on Mar. 30, 2020.

(51) Int. Cl.
*A63H 17/14* (2006.01)
*A63H 17/26* (2006.01)
*B62D 55/065* (2006.01)
*B62D 55/108* (2006.01)
*B62D 55/14* (2006.01)
*B62D 55/30* (2006.01)
*A63H 30/04* (2006.01)

(52) U.S. Cl.
CPC .......... *A63H 17/262* (2013.01); *A63H 17/14* (2013.01); *B62D 55/065* (2013.01); *B62D 55/108* (2013.01); *B62D 55/14* (2013.01); *B62D 55/30* (2013.01); *A63H 30/04* (2013.01)

(58) Field of Classification Search
CPC ...... A63H 17/262; A63H 17/14; A63H 30/04; B62D 55/065; B62D 55/108; B62D 55/14; B62D 55/30; B62D 55/04; B62D 55/084

USPC .................. 446/433, 431; 305/130
See application file for complete search history.

(56) References Cited

U.S. PATENT DOCUMENTS

| D115,835 | S |   | 7/1939 | Lombard |
|---|---|---|---|---|
| D208,685 | S |   | 9/1967 | Evans, Jr. |
| 3,427,746 | A |   | 2/1969 | Jacobs |
| 4,093,033 | A | * | 6/1978 | Rosch ............ B62D 55/07 |
|   |   |   |   | 180/9.56 |

(Continued)

OTHER PUBLICATIONS

"Goodyear Tires, "Wrangler MT/R" web page;http://www.goodyeartires.com/goodyeartireselector/display_tire.jsp?prodline=Wrangler+MT%2FR&mrktarea=Light+Truck&treadwidth=&aspectratio=&rimdiameter=&sidewall".

(Continued)

*Primary Examiner* — Nini F Legesse
(74) *Attorney, Agent, or Firm* — Daryl R. Wright; Greg Carr

(57) ABSTRACT

A treaded traction device for model vehicles is provided. The treaded traction device includes a biasing assembly and a tensioning assembly. The biasing assembly includes a first bias support fixed relative to a vehicle hub and a second bias support fixed relative to a traction hub. The biasing assembly also includes a coil and a dampener attached to the first and second bias supports. The treaded traction device is biased to result in one end being lower than another end. The tensioning assembly includes an idler wheel and a first and second tension support. The tension supports may be rotated to move the idler wheel, releasing tension on a surrounding tread. When the tension is released, the surrounding tread may be removed or replaced.

16 Claims, 6 Drawing Sheets

(56) References Cited

U.S. PATENT DOCUMENTS

| | | |
|---|---|---|
| D260,012 S | 7/1981 | Candiliotis |
| D261,257 S | 10/1981 | Guidry |
| D266,919 S | 11/1982 | Bennett |
| D268,663 S | 4/1983 | Bennett |
| 4,448,273 A | 5/1984 | Barbieri |
| 4,483,407 A | 11/1984 | Iwamoto et al. |
| 4,522,606 A * | 6/1985 | Goldfarb .............. A63H 31/00 |
| | | 446/463 |
| 4,706,769 A * | 11/1987 | Latourelle ............ B62K 13/00 |
| | | 180/9.26 |
| D296,200 S | 6/1988 | Elsesser |
| D296,544 S | 7/1988 | Matsushita et al. |
| D301,859 S | 6/1989 | Igarashi |
| D301,999 S | 7/1989 | Fujiki |
| D309,442 S | 7/1990 | Okada |
| D310,985 S | 10/1990 | Covert et al. |
| D313,582 S | 1/1991 | Tsutsumi et al. |
| D316,689 S | 5/1991 | Fujiki |
| D316,695 S | 5/1991 | Fujiki |
| 5,135,427 A | 8/1992 | Suto et al. |
| D329,413 S | 9/1992 | Chandler |
| D329,885 S | 9/1992 | Maarschalkerweerd et al. |
| 5,259,429 A | 11/1993 | Harms |
| 5,261,853 A | 11/1993 | Suto |
| 5,273,126 A | 12/1993 | Reed et al. |
| 5,340,205 A * | 8/1994 | Nagorcka ............ B62D 55/104 |
| | | 305/132 |
| D376,996 S | 12/1996 | Soucy et al. |
| 5,607,210 A | 3/1997 | Brazier |
| D379,442 S | 5/1997 | Ratliff, Jr. |
| D384,013 S | 9/1997 | Thomas |
| D389,432 S | 1/1998 | Dandurand |
| D389,433 S | 1/1998 | Dandurand |
| D389,435 S | 1/1998 | Dandurand |
| D390,178 S | 2/1998 | Maxwell |
| D391,211 S | 2/1998 | Maxwell |
| D394,615 S | 5/1998 | Dandurand |
| D395,627 S | 6/1998 | Ball et al. |
| D400,141 S | 10/1998 | Maxwell |
| D408,326 S | 4/1999 | Dandurand |
| D408,327 S | 4/1999 | Dandurand |
| D425,526 S | 5/2000 | Juncker et al. |
| D428,587 S | 7/2000 | Maxwell |
| 6,116,362 A | 9/2000 | Schubert et al. |
| 6,142,200 A | 11/2000 | Feider et al. |
| 6,176,334 B1 | 1/2001 | Lorenzen |
| D440,913 S | 4/2001 | McMannis |
| D441,697 S | 5/2001 | Allison |
| D445,379 S | 7/2001 | Guspodin et al. |
| D445,381 S | 7/2001 | Guspodin et al. |
| 6,264,283 B1 * | 7/2001 | Rehkemper .......... A63H 17/262 |
| | | 301/105.1 |
| D456,344 S | 4/2002 | Rooney |
| 6,401,847 B1 | 6/2002 | Lykken |
| D468,370 S | 1/2003 | Hattori |
| 6,557,953 B1 | 5/2003 | Kahle et al. |
| D483,718 S | 12/2003 | Hutz |
| D487,057 S | 2/2004 | Rooney et al. |
| D488,171 S | 4/2004 | Juncker et al. |
| D488,430 S | 4/2004 | Maxwell |
| D492,644 S | 7/2004 | Maxwell |
| D492,931 S | 7/2004 | Maxwell et al. |
| D496,328 S | 9/2004 | Shondel et al. |
| D497,621 S | 10/2004 | Inaoka et al. |
| D500,010 S | 12/2004 | Maziarka et al. |
| D504,656 S | 5/2005 | Green et al. |
| D505,136 S | 5/2005 | Brazier |
| D505,382 S | 5/2005 | Green et al. |
| D505,385 S | 5/2005 | Green et al. |
| 6,920,906 B2 | 7/2005 | Allison et al. |
| D508,674 S | 8/2005 | Dumigan et al. |
| D511,738 S | 11/2005 | Maxwell |
| D512,369 S | 12/2005 | Lo |
| D512,959 S | 12/2005 | Fukunaga |
| D514,501 S | 2/2006 | Nishimori |
| D522,450 S | 6/2006 | Gerasimczuk |
| D524,725 S | 7/2006 | Gerasimczuk |
| D528,133 S | 9/2006 | Brazier |
| D534,485 S | 1/2007 | Nakamura |
| D534,487 S | 1/2007 | Dumigan et al. |
| D535,248 S | 1/2007 | Ashton et al. |
| D535,610 S | 1/2007 | Morito et al. |
| D535,611 S | 1/2007 | Sundkvist et al. |
| D544,830 S | 6/2007 | Umstot et al. |
| D555,076 S | 11/2007 | Sakakibara et al. |
| D555,077 S | 11/2007 | Lo |
| D556,673 S | 12/2007 | Missik-Gaffney et al. |
| D556,674 S | 12/2007 | Missik-Gaffney et al. |
| D560,596 S | 1/2008 | Sakakibara et al. |
| D568,233 S | 5/2008 | Dixon et al. |
| D577,658 S | 9/2008 | Murata |
| D578,956 S | 10/2008 | Dixon et al. |
| D580,347 S | 11/2008 | Lo |
| D593,135 S | 5/2009 | Hansen |
| D594,401 S | 6/2009 | Guidry |
| D601,487 S | 10/2009 | Ebel et al. |
| D603,880 S | 11/2009 | Brazier |
| D604,689 S | 11/2009 | Frappart et al. |
| D612,797 S | 3/2010 | Lo |
| D612,799 S | 3/2010 | Wallet et al. |
| D618,160 S | 6/2010 | Jacobs |
| D619,529 S | 7/2010 | Georges et al. |
| D621,342 S | 8/2010 | Osaka |
| D627,709 S | 11/2010 | Harvey et al. |
| D632,244 S | 2/2011 | Green |
| D634,265 S | 3/2011 | Shan et al. |
| D636,793 S | 4/2011 | Vladimirovich |
| D639,313 S | 6/2011 | Vladimirovich |
| D653,195 S | 1/2012 | Sareen |
| D653,196 S | 1/2012 | Buchinger-Barnstorf |
| D653,198 S | 1/2012 | Buchinger-Barnstorf |
| D653,681 S | 2/2012 | Degtyarev |
| D668,204 S | 10/2012 | Leendertse et al. |
| D671,486 S | 11/2012 | Rooney et al. |
| D673,895 S | 1/2013 | Smith et al. |
| D676,799 S | 2/2013 | Sanae |
| D691,943 S | 10/2013 | Ma |
| 8,632,138 B2 | 1/2014 | Bessette |
| D706,707 S | 6/2014 | Jacobs |
| D707,620 S | 6/2014 | Barajas et al. |
| D709,435 S | 7/2014 | Jacobs |
| D709,436 S | 7/2014 | Ikeki |
| D711,928 S | 8/2014 | Brazier |
| D713,328 S | 9/2014 | Umstot et al. |
| D719,083 S | 12/2014 | Hayashi |
| D720,683 S | 1/2015 | Boore et al. |
| D730,272 S | 5/2015 | Fleckner |
| D732,463 S | 6/2015 | Petr et al. |
| D736,145 S | 8/2015 | Jacobs et al. |
| D743,874 S | 11/2015 | Philipot et al. |
| D744,412 S | 12/2015 | Schimmoeller |
| D746,763 S | 1/2016 | Kubo |
| D751,030 S | 3/2016 | Chen |
| D753,055 S | 4/2016 | Sato et al. |
| D753,056 S | 4/2016 | Kuwano |
| D756,898 S | 5/2016 | Kristen |
| D762,561 S | 8/2016 | Petr |
| D762,562 S | 8/2016 | Bonifas |
| D767,474 S | 9/2016 | Reim et al. |
| 9,452,796 B2 | 9/2016 | Franck et al. |
| D768,033 S | 10/2016 | Degtyarev |
| D768,034 S | 10/2016 | Degtyarev |
| D770,970 S | 11/2016 | Kuwano et al. |
| D773,385 S | 12/2016 | Kuwano |
| D775,061 S | 12/2016 | Ishiguro et al. |
| D780,674 S | 3/2017 | Chen |
| D781,777 S | 3/2017 | Hayashi |
| D783,510 S | 4/2017 | Thornburg |
| D785,548 S | 5/2017 | Fukunaga et al. |
| D788,687 S | 6/2017 | Williams et al. |
| D791,687 S | 7/2017 | Sueyoshi |
| D795,796 S | 8/2017 | Johnson |
| D796,426 S | 9/2017 | Liu |
| D798,912 S | 10/2017 | Doyle |

(56) References Cited

U.S. PATENT DOCUMENTS

| | | |
|---|---|---|
| D806,640 S | 1/2018 | Petr |
| D810,002 S | 2/2018 | Sprowl et al. |
| D810,669 S | 2/2018 | Johnson |
| D813,791 S | 3/2018 | Wang et al. |
| D816,018 S | 4/2018 | Chiang et al. |
| D816,596 S | 5/2018 | Schimmoeller et al. |
| D818,424 S | 5/2018 | Podlovits |
| D824,458 S | 7/2018 | Vaarsi |
| D832,368 S | 10/2018 | Barajas et al. |
| D838,662 S | 1/2019 | Tikka et al. |
| D840,478 S | 2/2019 | Sprowl et al. |
| D844,547 S | 4/2019 | Sakamoto et al. |
| D845,224 S | 4/2019 | Kochanek |
| D847,729 S | 5/2019 | Kujime |
| D849,677 S | 5/2019 | Sakamoto et al. |
| D856,268 S | 8/2019 | Sprowl et al. |
| D858,426 S | 9/2019 | Geng et al. |
| D859,294 S | 9/2019 | Taylor |
| D859,298 S | 9/2019 | Geng et al. |
| D876,327 S | 2/2020 | Jens Christensen et al. |
| D877,055 S | 3/2020 | Jens Christensen et al. |
| D879,020 S | 3/2020 | Sato et al. |
| D888,651 S | 6/2020 | Zhang |
| D892,715 S | 8/2020 | Sato |
| D902,840 S | 11/2020 | Zhao |
| D902,963 S | 11/2020 | Wood et al. |
| D904,530 S | 12/2020 | Sprowl et al. |
| D962,153 S | 8/2022 | Choi et al. |
| D972,491 S | 12/2022 | Wang et al. |
| D972,656 S | 12/2022 | Chen |
| D973,576 S | 12/2022 | Kreitzman et al. |
| D988,237 S | 6/2023 | Geng et al. |
| 2013/0078888 A1 | 3/2013 | Mayer et al. |
| 2015/0291235 A1* | 10/2015 | Zuchoski ............... B62D 55/24 305/142 |
| 2017/0036714 A1 | 2/2017 | Lunkenbein |
| 2019/0143757 A1 | 5/2019 | Fredenburg et al. |
| 2019/0144054 A1 | 5/2019 | Bliss |
| 2020/0114801 A1 | 4/2020 | Bering et al. |
| 2020/0324837 A1 | 10/2020 | Weyer et al. |

OTHER PUBLICATIONS

Interco Tire, "TM Appl'n No. 74279000" Interco Tire Corporation, Rayne LA USA, May 27, 1992.

Traxxas, www.traxxas.com archive web page Jul. 10, 2004, Traxxas LP, Plano TX USA, Jul. 10, 2004.

Traxxas, "REVO Owners Manual", Traxxas LP, Plano TX USA; Jul. 2004.

Traxxas, "REVO Service and Support Guide / Parts List", Traxxas LP, Plano TX USA; Jul. 2004.

Traxxas, "REVO Power.Precision.Balance" product announcement web pages, traxxas.com; Traxxas LP, Plano, TX USA, Apr. 8, 2004.

Kumho Tire; http://www.kumhousa.com/tire/category/truck-suv/F8656BD8-0A87-4166-82B5-0DF52D4AC17E; Sep. 2016.

Traxxas; Tires, Maxx AT; Sep. 2016.

Traxxas [online] found Jan. 2, 2018 from URL https://traxxas.com/products/parts/8369B1=overview.

Screenshot and detail from Traxxas.com: Tires and wheels, assembled, glued (2.6" black, satin chrome-plated Mercedes-Benz G 500 4×42 wheels, 2.6" tires( (2)/center caps (2) (requires #8255A extended stub axle). Undated; one page. Found online Nov. 6, 2019 at https://traxxas.com/products/parts/8872 (Year: 2019).

Traxxas TRX-4 1/10 Scale Trail Rock Crawler (Orange) w/All-Terrain Traxx [Nov. 5, 2019] found online [Nov. 5, 2019]—Traxxas TRX-4 1/10 Scale Trail Rock Crawler (Orange) w/All-Terrain Traxx.

Traxxas TRX-4 1/10 Scale Trail Rock Crawler w/All-Terrain Traxx [Jun. 22, 2020]. Found online Jun. 22, 2020 at https://redlinehobby.ca/shop/traxxas-traxx-trx-4-4-complete-set-front-rear-order-on-demand (Year: 2020).

* cited by examiner

TREADED TRACTION DEVICE AND SYSTEM FOR MODEL VEHICLES

RELATED APPLICATIONS

This application claims the benefit of a related U.S. Provisional Application Ser. No. 63/002,065, filed Mar. 30, 2020, entitled "TREADED TRACTION DEVICE AND SYSTEM FOR MODEL VEHICLES," to Jonathan Scott WOOD et al., the disclosure of which is incorporated by reference herein in its entirety.

BACKGROUND

The following descriptions and examples are not admitted to be prior art by virtue of their inclusion in this section.

There are many different types of Radio Controlled (R/C, RC, Remote Controlled) model vehicles existing in the market place at this time. One type of RC model vehicle is a scale model vehicle. In scale model vehicles, designs are intended to appear similar to full size counterparts, but producing functionality using scaled down versions of the components often presents issues and challenges not present in the full size world. Some of the scale RC model vehicles are used for a particular type of radio controlled course or activity in which the RC model vehicles attempt to traverse difficult terrain and obstacles.

The RC model vehicles, often referred to as crawlers, compete in competitions to demonstrate their skill and ability. For crawlers, one area that users may try to improve is increasing the traction of the RC model vehicles across various types of terrain. One way to do that is by the use of various types of traction devices, such as specially designed wheels or treaded traction devices, for example. However, users may still wish to have an option of switching between the types of traction devices, so interchangeability may be desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An embodiment of the claimed disclosure may comprise a model vehicle including a treaded traction device. The treaded traction device may include a biasing assembly. The biasing assembly may further include a first bias support fixed relative to a vehicle hub and a second bias support fixed relative to a traction hub. In addition, the biasing assembly may include a resilient member coupled to the first bias support and the second bias support and a dampener member coupled to the first bias support and the second bias support. Wherein the treaded traction device is biased such that a rear end of the treaded traction device is positioned lower than a front end of the treaded traction device when unloaded.

An additional embodiment of the claimed disclosure may comprise a treaded traction device for a model vehicle including a tensioning assembly. The tensioning assembly may further include an idler wheel and a first tension support member pivotally coupled with the idler wheel and pivotable between a first tensioned position and a first untensioned position. In addition, the tensioning assembly may include a second tension support member pivotally coupled with the idler wheel and pivotally coupled with a treaded traction device structure supporting a drive wheel axle and a tension securing device for releaseably securing the first tension support member in the first tensioned position.

Wherein the second tension support member is pivotable between a second tensioned position and a second untensioned position. And wherein the idler wheel is rotated away from an inner surface of a surrounding tread when the second tension member is pivoted between the second tensioned position to the second untensioned position to facilitate removal of the surrounding tread.

A further embodiment of the claimed disclosure may comprise a treaded traction device for a model vehicle. The treaded traction device may include a biasing assembly containing a first bias support fixed relative to a vehicle hub. The biasing assembly may further contain a second bias support fixed relative to a traction hub and a coil coupled to the first bias support and the second bias support. In addition, the biasing assembly may include a dampener member coupled to the first bias support and the second bias support. Wherein the treaded traction device is biased such that a first end of the treaded traction device is positioned lower than a second end of the treaded traction device when unloaded.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

There are many different types of traction devices for Radio Controlled (R/C, RC, and Remote Controlled) model vehicles. The most commonly used traction device is a wheel. A motor, either electric and/or combustion, provides the rotating torque which is transmitted either directly or through a system of drive shafts, gears and/or transmissions to the individual wheels. For a general example, in a typical 4-wheeled vehicle, 1, 2, or 4 of the wheels may be driven. Of course, RC model vehicles may have more or fewer wheels and the powering configuration may be determined as needed by the desired application.

Having a wheel as a traction device is best for a specific variety of road or pathway surfaces. For a general example, when a wheel is applied to a very loose surface, such as mud, sand or snow, or a steeply inclined surface, the wheel as a traction device may sink into the surface or slip as the case may be. In order to increase traction and to provide a strong propulsive force (among other benefits) for an RC model vehicle, the embodiments of this disclosure are traction devices comprising a tread and multiple drive/contact wheels.

One example of the treaded traction devices would be a tank tread for a military vehicle or a treaded traction device for a bull dozer or snow cat. The wide surface area of the tread helps to spread the weight of the vehicle out across a broader contact patch than usually provided by a radial tire. In addition, the contact of more treads against the terrain surface enhances the traction provided by a treaded traction device as compared to even a standard specialty or off-road wheel.

Figure 1:
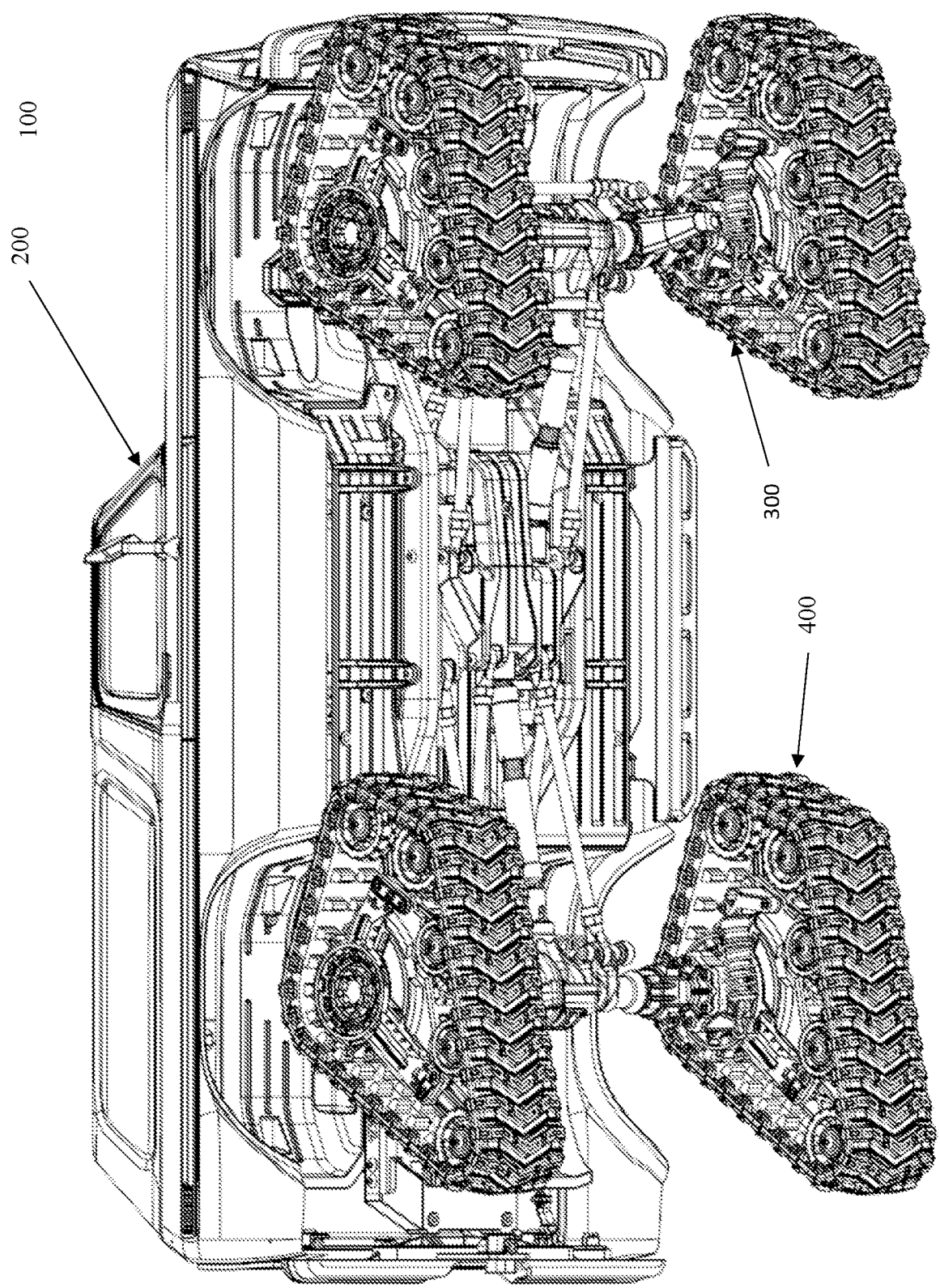
FIG. 1 illustrates a lower right perspective view of an RC model vehicle equipped with treaded traction devices in unloaded positions, according to an embodiment of the current disclosure.

Referring generally to FIG. 1, this figure illustrates an RC model vehicle 100 using a treaded traction device system in place of all four wheels. In some cases, only two wheels may be replaced and the other two may use ski's or other types of devices suitable for the intended terrain. In this figure, the lower, right side view of an RC model vehicle 100 is fitted with two front treaded traction devices 300 and two rear treaded traction devices 400. Both the front and the rear treaded traction devices 300, 400 are configured to fit within the wheel wells of a scale type RC model vehicle body 200 and are also configured to slightly rotate within a desired range relative to the rest of the RC model vehicle.

In this particular embodiment, all four treaded traction device 300,400 are driven but in some cases, only two treaded traction devices are driven while the other two may be free-wheeling but still able to provide support and distribute weight across the terrain surface. The front treaded traction devices 300 are configured to steer and provide direction control while the rear treaded traction devices 400 are fixed with regards to direction. However, in some cases, an RC model vehicle 100 fitted with treaded traction devices 300,400 may be configure to additionally change direction by rotating opposite sides of RC model vehicle 100 in different directions.

The RC model vehicle may be run with either wheels or treaded traction devices. The attachment device for the treaded traction device to the RC model vehicle may be the same as the attachment device for the wheels. In some cases, the attachment device may be a hex bolt for securing to a threaded driving axle. The driving axle may be in the form of a traditional fixed axle or a final portal gear drive axle as shown in the figure. Of course, a non-driven freewheeling axle may be substituted for a driving axle in either case.

The driving axle may be supported by a vehicle hub near the wheel or treaded traction device attachment point. The vehicle hub is non-rotating relative to the remainder of the RC model vehicle although it may travel vertically and horizontally due to suspension movement. The vehicle hub may be used to support the outer wheel bearing for the driving axle. In the case of an RC vehicle using wheels, the vehicle hub may be the outermost non-rotating component of the drivetrain.

However, in the case of an RC vehicle using a treaded traction device, a secondary structure is needed in order to support the driving, idler, and road wheels of the treaded traction device. Since the treaded traction device assembly has an essentially non-rotating component and a rotating component (the drive wheel), another hub is needed. This additional outer hub may be referred to as a traction hub. The traction hub may rotate relative to the vehicle hub through a desired range. But the traction hub is essentially non-rotating with respect to the remainder of the treaded traction device.

When an RC model vehicle is in the air after performing a jump or crossing a crevasse for example, the treaded traction devices 300,400 should be positioned in a particular orientation that may increase the RC model vehicle's operating parameters and performance. For this illustrative embodiment, the front 310,410 of each of the treaded traction devices 300,400 is positioned higher than the rear 320,420 when the treaded traction devices 300,400 are unloaded (also see FIG. 2). An example of a loaded position for the treaded traction devices 300,400 may be viewed in FIG. 3. The traction control devices 300,400 may be further rotated past the loaded position to establish a desired range of rotation relative to the rest of the RC model vehicle.

The limit to the range of rotation the treaded traction device 300 can move about the final portal gear drive axle 560 may be determined due to performance requirements of a specific application and the potential terrain that the treaded traction device 300 may encounter. In most cases, the amount of rotation will be a number of degrees clockwise and counterclockwise as measured from a RC model vehicle 100 resting on level terrain (and providing a load to the treaded traction device 300). In some cases, the number of degrees may be 10 degrees, but the limits to rotation of the treaded traction devices 300,400 do not need to be equal in the clockwise and counterclockwise directions and may be as large or as small as appropriate for the particular application and RC model vehicle type. Hard limits may prevent rotation outside of this desired range.

Figure 2:
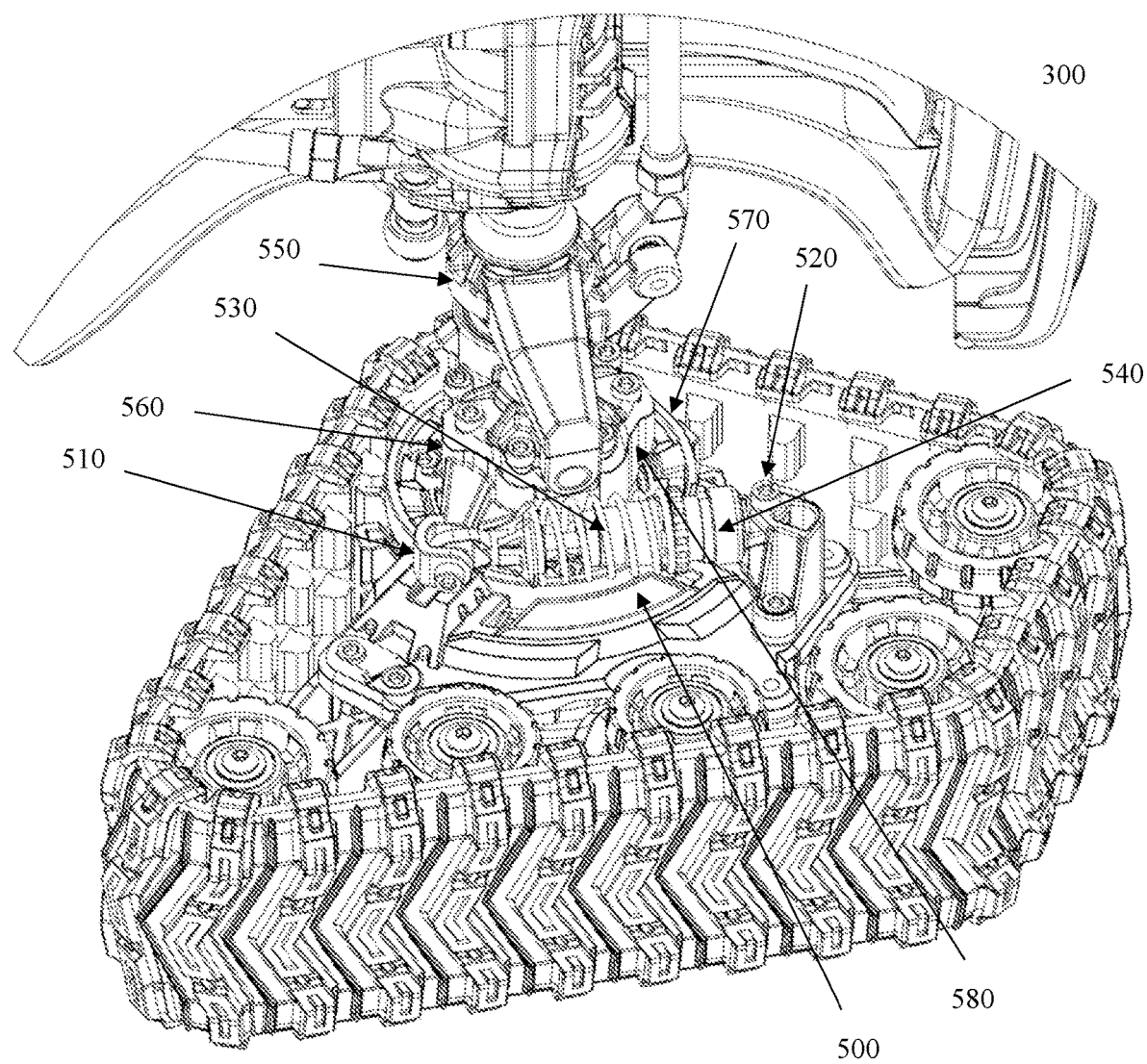
FIG. 2 illustrates a close up view of the front left treaded traction device of FIG. 1, showing a biasing assembly in an unloaded position, according to an embodiment of the current disclosure.

Turning now to FIG. 2, this figure shows a close-up view of a front treaded traction device 300. Even though this is a front treaded traction device 300, the teachings may apply to both the front and the rear treaded traction devices 300,400 depending upon the application. As described earlier, an unloaded treaded traction device 300 is biased to rise up in the front and extend down in the rear, essentially rotating around a final portal gear drive axle 560. In this case, a portal gear assembly is used to increase the ground clearance of the RC model vehicle 100, in other embodiments, the treaded traction device may be driven directly from the main drive axle 550.

One reason for this bias is to improve performance and for crossing terrain in which the tread may be temporarily unloaded and loaded again. The bias is ensured by a biasing assembly 500. Embodiments of the biasing assembly 500 may comprise a first bias support 510 and a second bias support 520. In addition, in some instances there may be a resilient member 530 and a dampener 540. The first and second bias supports 510,520 may be located apart from an axis defined by the final portal drive axle 560, in order to produce a moment arm force against the treaded traction device 300.

The first bias support 510 may be fixed relative to the vehicle side of the structure containing the final portal gear drive axle 560, such as the portal gear housing 580. In some other embodiments, the first bias support 510 may be fixed relative to the vehicle side suspension structure supporting the outside wheel hubs (i.e., the non-rotating vehicle side suspension structure such as the bearing housings, bearing supports or the brake caliper supports, among others, for example), such as a vehicle hub (in this illustrative embodiment, the portal gear housing 580 is also the vehicle hub). The second bias support 520 may be fixed relative to the rest of the treaded traction device 300, such as a traction hub 570. In addition to providing a bias in the counter clockwise direction (around the final portal gear drive axle 560), the biasing assembly 500 also provides a limit to the amount of rotation the treaded traction device 300 can move about the final portal gear drive axle 560.

The traction hub 570 may rotate slightly clockwise and counterclockwise relative to the vehicle hub, or portal gear housing 580. The limit to the amount of counter clockwise rotation is generally shown in the illustrated figure. The amount of clockwise rotation (not shown) in some cases may be similar to the counterclockwise rotation limit. However, while the amounts of rotation in either direction may be equivalent, there is no requirement that they are equivalent.

The first bias support 510 is fixed relative to the vehicle hub or portal gear housing 580. The resilient member 530, here shown by a coil over spring, pushes or biases the second bias support 520 away from the first bias support 520. This resilient force provides the energy that results in the counterclockwise rotation about the portal gear 560 axle. When the treaded traction device 300 is driven, the treaded traction device 300 may be subject to a clockwise rotative force due to the portal gear 560 axle.

In addition to the resilient member 530, the biasing assembly 500 may comprise a dampener 540. In this particular embodiment, the dampener 540 is shown by a shock absorber. The dampener 540 helps to smooth out the rotation in either direction and also help absorb various rotative impacts and forces.

Figure 3:
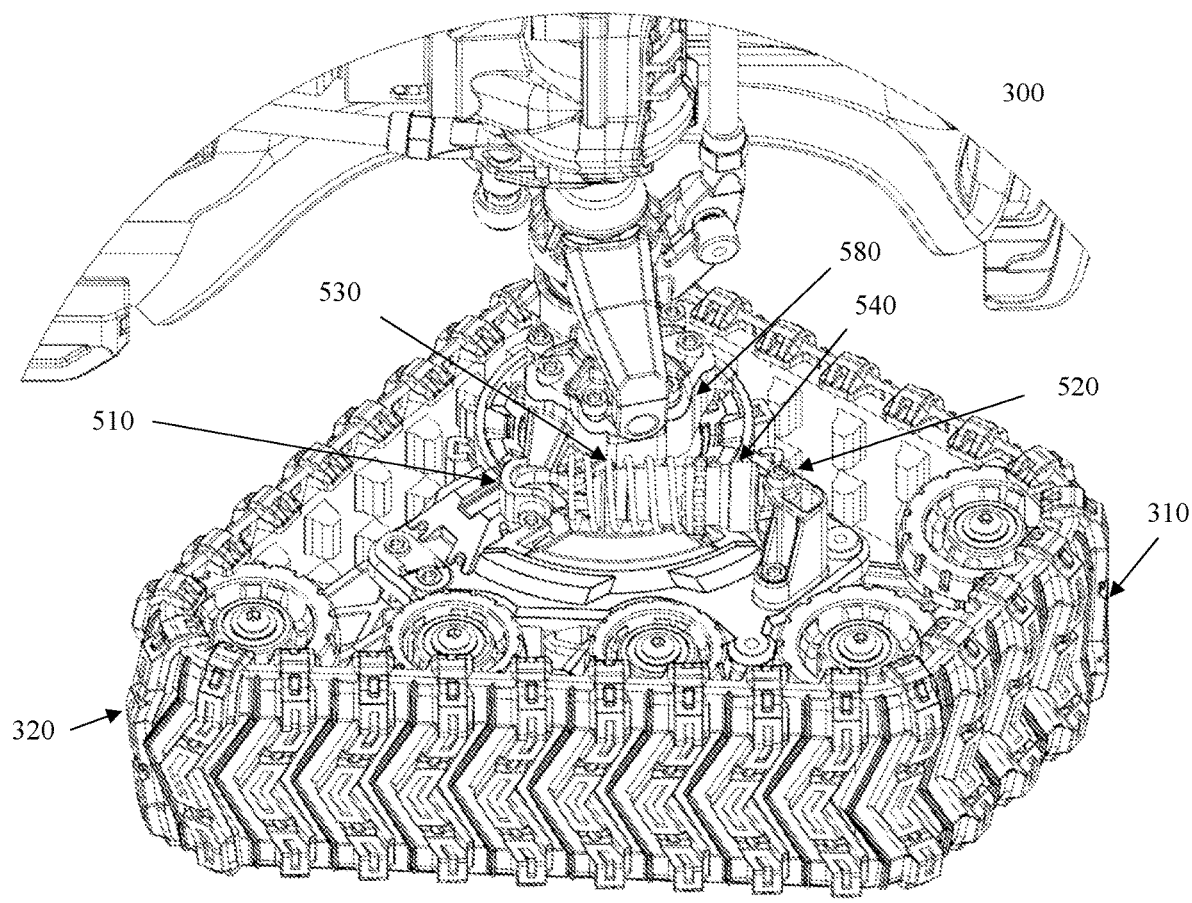
FIG. 3 illustrates the view of FIG. 2, but showing the biasing assembly in a loaded position, according to an embodiment of the current disclosure.

Referring generally to FIG. 3, as stated previously, this illustrative figure shows a treaded traction device 300 in a loaded condition (i.e., on level ground). As can be seen in this figure relative to FIG. 2, the first bias support 510 is closer to the second bias support 520. In addition, the resilient member 530 should be shown in a compressed state, but limitations for the computer aided design software did not allow this. Therefore, the resilient member 530 is shown extending beyond the left end of the dampener 540.

In addition to providing a predetermined orientation for an unloaded treaded traction device, there must be a way to limit or constrain the amount of rotation of the treaded traction device relative to the rest of the RC model vehicle. For the embodiment show, the anti-rotation (relative to the RC model vehicle), or more generally, the rotation limiting components, are shown most clearly in FIGS. 2 and 3. In general, rotation is limited due to the extent of travel of the dampener, both in compression and tension.

Figure 4:
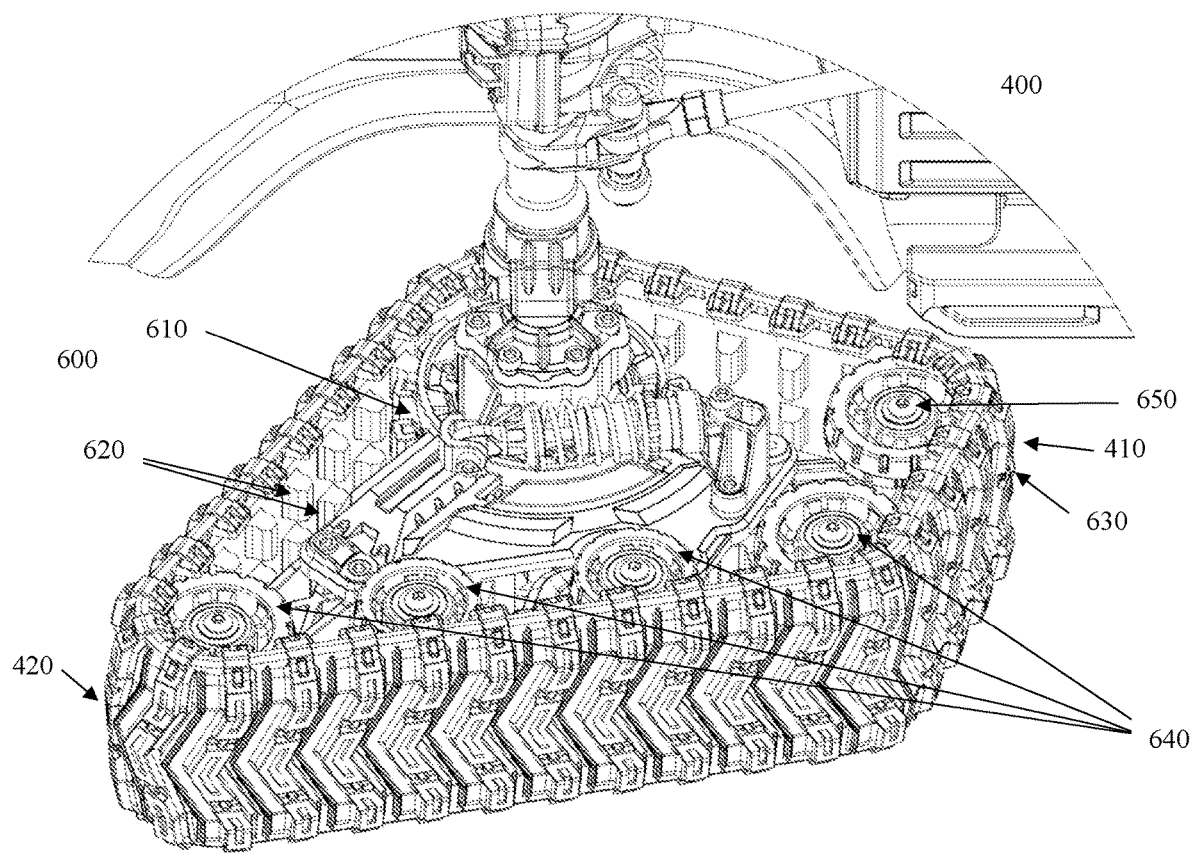
FIG. 4 illustrates a close up view of the rear left treaded traction device of FIG. 1 showing a drive assembly, according to an embodiment of the current disclosure.

Turning now to FIG. 4, this figure generally illustrates an embodiment of the rear treaded traction device 400. As with the previous figures, the teachings described for the rear treaded traction device 400 may apply to front treaded traction device 300 and vice versa. For example, the biasing assembly 500 functions the same for the rear treaded traction device 400 as with the front treaded traction device 300, and a subsequent description is omitted in the interest of brevity. The details of the drive system 600 will be described using this figure.

The drive system 600 may comprise a drive wheel 610 and driving gears 620. In this case, the drive wheel 610 comprises a geared wheel interacting and motivating the surrounding tread 630 via driving gears 620 or teeth, protrusions, etc., molded into the inside of the surrounding tread 630. The drive wheel 610 functions in the same position and provides a rotating force as a standard wheel, but instead of contacting the ground or terrain, the drive wheel 610 motivates the surrounding tread 630 to rotate about treaded traction device 400.

The rest of the drive system 600 may comprise road wheels 640 and an idler wheel 650. Road wheels 640 are not to be confused with standard wheels. In this case, road wheels 640 are the guide wheels that contact the ground via the surrounding tread 630. The idler wheel 650 is added to provide tension and facilitate the installation and removal of the surrounding tread 630. However, the drive wheel 610 may further comprises an additional traction hub 570 to support non-rotating elements of the treaded traction device 300,400.

Although only a single drive wheel 610 is shown, in some embodiments there may be additional drive wheels 610 provided via geared transmission systems and components. In addition, the number and placement of the road wheels 640 and the idler wheel 650 is due to design, the placement and numbers of individual wheels may vary depending upon the application. In this embodiment, the first and last road wheel 640 are larger in diameter than the middle two road wheels 640. The middle two road wheels 640 may be implemented so as to move vertically in some degree of independence from the first and last road wheel 640. Independent movement may allow for increased and more consistent ground contact by the surrounding tread 630.

Figure 5:
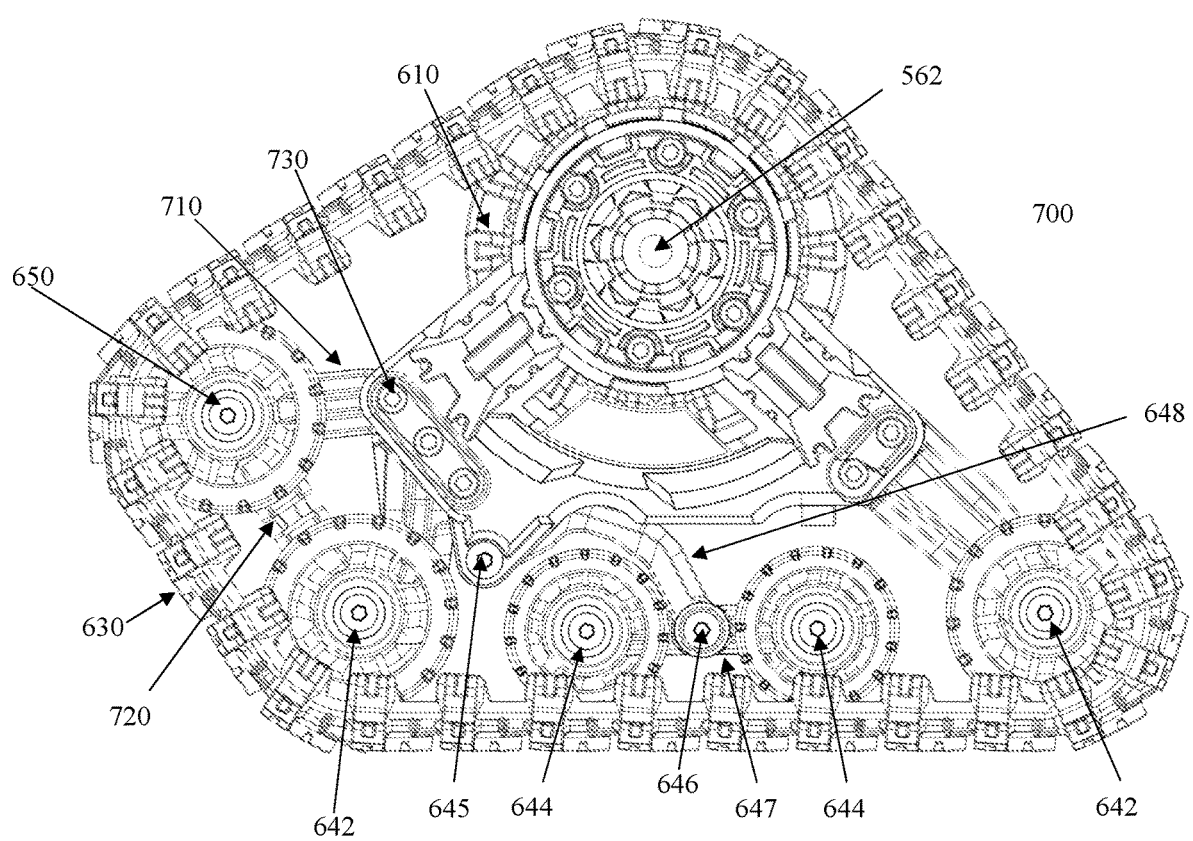
FIG. 5 illustrates an outside view of a treaded traction device showing a tension assembly in a tensioned position, according to an embodiment of the current disclosure.

FIG. 5 will now be used as an illustrative embodiment to further describe the drive system 600 and elements of the tread removal system 700. While the previous figures illustrated the treaded traction devices 300,400 as seen from underneath the RC model vehicle 100, FIG. 5 shows the treaded traction devices 300,400 as visible from an observer outside of the vehicle, opposite to the previous figures. Again, teachings from this illustrative embodiment may be used for both the front treaded traction device 300 and the rear treaded traction device 400.

Referring to this illustrative embodiment, the drive wheel 610 is located at the top of the figure and rotates about the portal gear axle 562 (visible in this figure), and the idler wheel 650 is positioned to the left hand side. The various road wheels 640 are shown at the bottom of the figure. The road wheels 640 comprise a first road wheel 642, two middle road wheels 644, and a last road wheel 642. The first and last road wheels 642 have larger diameters than the middle road wheels 644 in this embodiment, but in other embodiment all of the road wheels 640 may have the same diameter.

As previously mentioned, the middle road wheels 644 may be configured to move independently of the first and last road wheels 642. In some applications, the independent movement of the middle road wheels 644 may be provided in order to allow for an increased ability of the surrounding tread 630 to maintain contact with uneven terrain, etc.

For example, middle road wheels 644 may be pivotally coupled to one another about a first pivot point 646 by a first connecting member 647. When one middle road wheel 644 moves vertically upward, the first pivot point 646 may allow the other middle road wheel 644 to move vertically downward. In addition to being able to rotate or pivot about the first pivot point 646, the middle road wheels 644 may also be configured to move together in an upward and downward vertical direction.

In this illustrative example, additional maneuverability may be provided to the middle road wheels 644 by pivotally coupling the first pivot point 646 to a second pivot point 645 using a second connecting member 648. Due to the resiliency of the surrounding tread 630, the middle road wheels 644 may both move vertically upward as the first pivot point 646 is pivoted about the second pivot point 645. The movement of the middle road wheels 644 downward may be inhibited due to the resiliency of the surrounding tread 630.

In some embodiments, the second pivot member 648 may be biased vertically downward or in a clockwise direct due to a resilient device, such as a spring, torsion bar, etc., among others (not shown in this figure). Use of a resilient biasing device may increase the ability of the surrounding tread 630 to maintain contact with the terrain.

Figure 6:
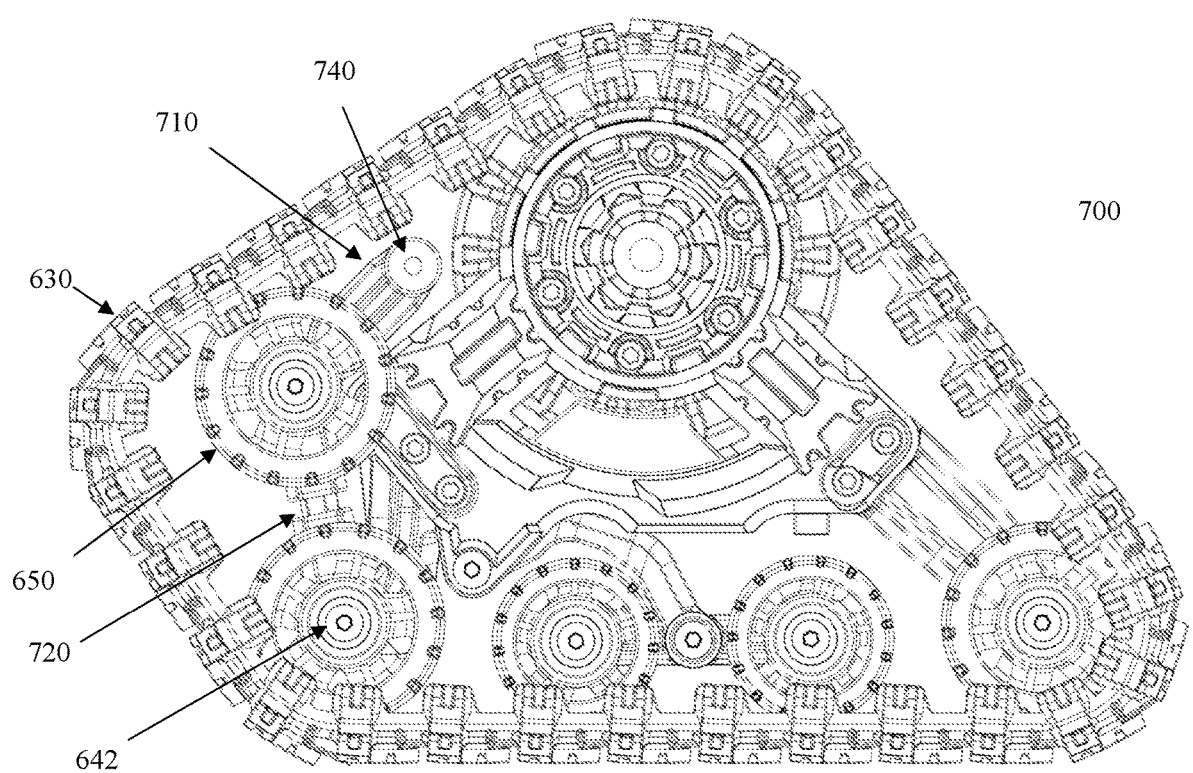
FIG. 6 illustrates the view of FIG. 5 but showing the tension assembly in an untensioned position, according to an embodiment of the current disclosure.

FIG. 5 shows the tensioning assembly 700 in a tensioned positioned. FIG. 6 is an illustration of FIG. 5 but showing the tensioning assembly 700 in an untensioned position. The tensioning assembly 700 may impart a tension to the surrounding tread 630 about the treaded traction device 300, 400 and allow for removal and installation. Referring to both of these figures, the tensioning assembly 700 may comprise the idler wheel 650, a first tension support 710, a second tension support 720, and a tension securing device 730.

The first tension support 710 may be pivotally coupled to the idler wheel 650 and a free end 740 may rotate about axis defined by an axle of the idler wheel 650. The first tension support 710 may pivot between a first tensioned position (shown in FIG. 5) and a first untentioned position (shown in FIG. 6). The second tension support 720 may pivotally couple idler wheel 650 to the first road wheel 642 and may rotate about an axis defined by an axle of the first road wheel 642. In addition, the first tension support 720 may further be pivotally coupled with the second tension support 710 and configured to rotate about the axis defined by an axle of the idler wheel 650. The second tension support 720 may pivot between a second tensioned position (shown in FIG. 5) and a second untensioned position (shown in FIG. 6).

As stated previously, the tensioning assembly 700 is shown in a tensioned position in which the first tension support 710 is rotated clockwise into the tensioned position and secured by the tension securing device 730. Although not visible in this figure, the free end 740 (see FIG. 6) of the first tension support 710 may interact with the rest of the treaded traction device 300,400 via an inclined surface, etc., to more easily slide into position where it may be fixed with the tension securing device 730. In this illustrative example, the tension securing device 730 is shown by a threaded mechanical fastener but may be replaced with other appropriate releasable securing devices as appropriate for the application, such as pins, latches, snap fits, or rivets for example, among others.

In some cases, the free end 740 of the first tension support 710 may also be provided with features (not shown) that are configured to interact with the rest of the treaded traction device 300,400 to temporarily hold the free end 740 in the first tensioned position. Holding in the first tensioned position may facilitate fixing or retaining the first tension support 710 in position relative to the rest of the treaded traction device 300,400 via the tension securing device 730. For example, slight protrusions on either the free end 740 or the rest of the treaded traction devices 300,400 may interact with corresponding concavities to provide a slight retention force (e.g., such as in a snap fit mechanism, among others) when the first tension support 710 is rotated into a first tensioned position.

The second tension support 720 may be pivotally coupled with the first tension support 710 and the first road wheel 642 or a treaded traction device structure supporting the traction hub and the drive wheel axle. The second tension support 720 may rotate relative to the first tension support 710 about an axis defined by an axle of the idler wheel 650. In addition, the second tension support 720 may also rotate about a pivot point in the treaded traction device structure, such as in this illustrative appointment, an axis defined by an axle of the first road wheel 642.

This facilitates components from the tensioning assembly 700 comprising the first tension support 710, idler wheel 650, and the second tension support 720 to move towards the center of the treaded traction devices 300,400, away from the inner surface of the surrounding tread 630, as most easily seen in FIG. 6 when the second tension support 720 is in a second untensioned position. In other words, relative to this view, the first tension support 710 is rotated counterclockwise about the idler wheel 650 axle and the idler wheel 650 is rotated clockwise about the first road wheel 642 axle.

When the tensioning assembly 700 is in an untensioned position, such as the one shown in FIG. 6, the surrounding tread 630 may be removed or installed around the treaded traction devices 300,400. After positioning the surrounding tread 630 about the exterior of the treaded traction devices 300,400, the idler wheel 650 may be rotated counterclockwise about the first road wheel 642 axle to contact the inner surface of the surrounding tread 630, as seen in FIG. 5 and when the second tension support 720 is in a second tensioned position. As the first tension support 710 is rotated clockwise about the idler wheel 650 axle, an appropriate amount of tension is established in the surrounding tread 630. The free end 740 of the first tension support 710 is then fixed in position relative to the treaded traction device 300,400 via the tension securing device 730.

Securing the free end 740 of the first tension support 710 in the first tensioned position also secures the second tension support 720 in the second tensioned position. The second tension support 720 may not be pivotally rotated into the second untensioned position while the first tension support 710 is in a tensioned position. In the treaded traction device 300,400 shown, the first tension support 710 must be pivoted from a first tensioned position into a first untensioned position prior to pivoting the second tension support 720 from a second tensioned position to a second untensioned position.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A model vehicle comprising a treaded traction device comprising:
   a drive wheel providing a motivating force to a surrounding tread;
   a biasing assembly comprising:
     a first bias support fixed relative to a vehicle hub;
     a second bias support fixed relative to a traction hub;
     a resilient member coupled to the first bias support and the second bias support; and
     a dampener member coupled to the first bias support and the second bias support;
   wherein the treaded traction device is biased such that a rear end of the treaded traction device is rotated about the drive wheel to be positioned lower than a front end of the treaded traction device when the treaded traction device is unloaded.

2. The model vehicle described by claim 1 wherein the resilient member is a spring coil.

3. The model vehicle described by claim 1 wherein the dampener member is a shock absorber.

4. A treaded traction device for a model vehicle comprising:
   a tensioning assembly comprising:
     an idler wheel;
     a first tension support pivotally coupled with the idler wheel and pivotable between a first tensioned position and a first untensioned position;
     a second tension support pivotally coupled with the idler wheel and pivotally coupled with a treaded traction device structure supporting a drive wheel axle;
     a tension securing device for releaseably securing the first tension support in the first tensioned position;
   wherein the second tension support is pivotable between a second tensioned position and a second untensioned position;
   wherein the idler wheel is rotated away from an inner surface of a surrounding tread when the second tension support is pivoted between the second tensioned position to the second untensioned position facilitating removal of the surrounding tread.

5. The treaded traction device described by claim 4, wherein the first tension support member is temporarily held in the tensioned position by a snap fit.

6. The treaded traction device described by claim 4, wherein the first tension support member is secured in the tensioned position by a tension securing device.

7. The treaded traction device described by claim 6, wherein the tension securing device is a threaded fastener.

8. A treaded traction device for a model vehicle comprising:
   a drive wheel providing a motivating force to a surrounding tread;
   a biasing assembly comprising:
     a first bias support fixed relative to a vehicle hub;
     a second bias support fixed relative to a traction hub;
     a coil coupled to the first bias support and the second bias support; and
     a dampener member coupled to the first bias support and the second bias support;
   wherein the treaded traction device is biased such that a front end of the treaded traction device is rotated about the drive wheel to be positioned higher than a rear end of the treaded traction device when unloaded.

9. The treaded traction device as described by claim 8, wherein the rear end of the treaded traction device is defined by a last road wheel.

10. The treaded traction device as described by claim 8, wherein the front end of the treaded traction device is defined by a first road wheel.

11. The treaded traction device as described by claim 8, wherein a middle road wheel is configured to independently move vertically relative to a first road wheel and a last road wheel.

12. The treaded traction device as described by claim 8, further comprising a tensioning assembly.

13. The treaded traction device as described by claim 12, wherein the tensioning assembly further comprises:
    an idler wheel;
    a first tension support pivotally coupled with the idler wheel between a first tensioned position and a first untensioned position;
    a second tension support pivotally coupled with the idler wheel and pivotally coupled with a treaded traction device structure supporting a drive wheel axle;
    a tension securing device for releaseably securing the first tension support in the first tensioned position;
    wherein the second tension support is rotatable between a second tensioned position and a second untensioned position;
    wherein the idler wheel is rotated away from an inner surface of a surrounding tread when the second tension is rotated between the second tensioned position to the second untensioned position facilitating removal of the surrounding tread.

14. The treaded traction device described by claim 13, wherein the first tension support member is temporarily held in the tensioned position by a snap fit.

15. The treaded traction device described by claim 13, wherein the first tension support member is secured in the tensioned position by a tension securing device.

16. The treaded traction device described by claim 13, wherein the tension securing device is a threaded fastener.

* * * * *